Patented Oct. 5, 1954

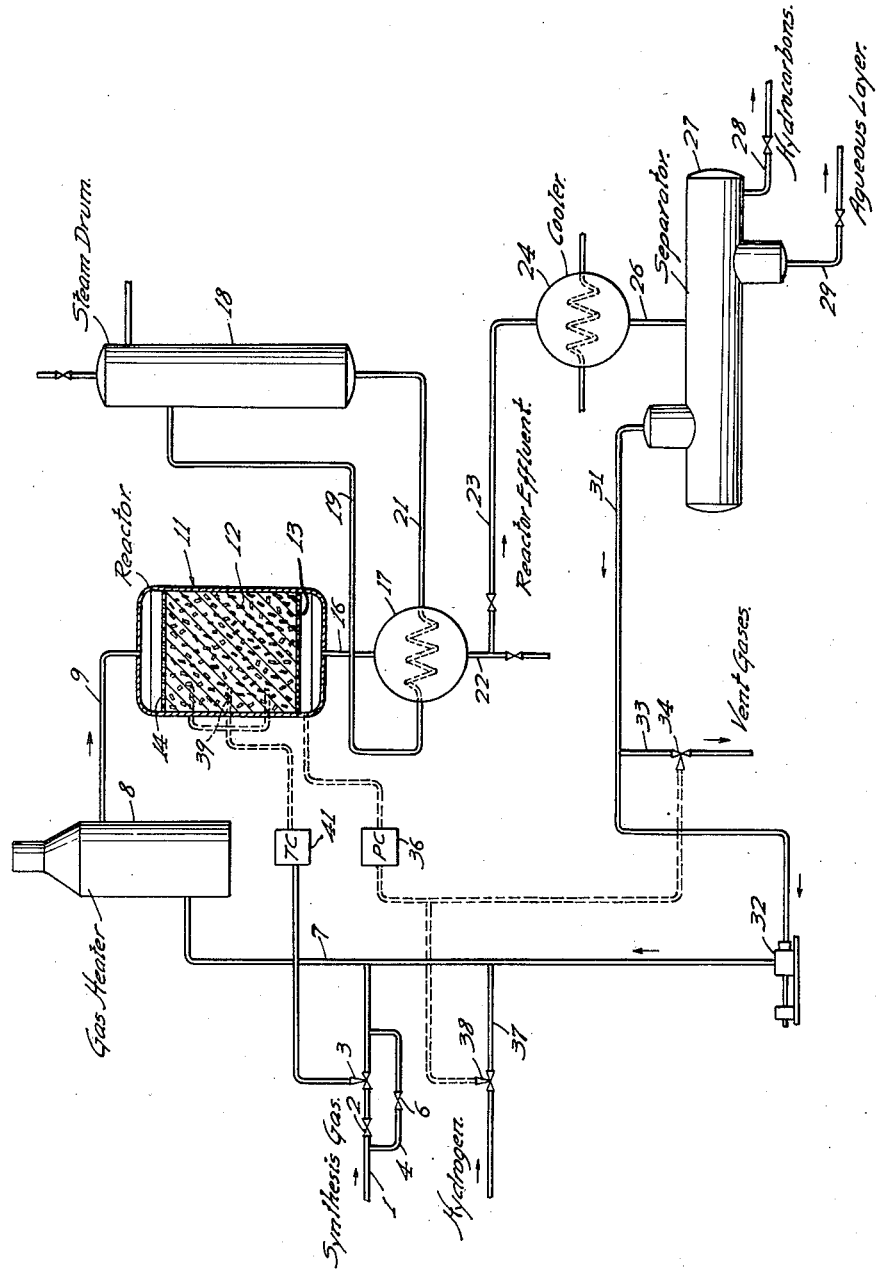

2,691,033

UNITED STATES PATENT OFFICE 2,691,033

METHOD OF STARTING UP HYDROCARBON SYNTHESIS UNITS

Joseph C. Easly and Hugh L. Kellner, Oakmont, Pa., assignors to Gulf Research & Development Company, Pittsburgh, Pa., a corporation of Delaware Application August 10, 1949, Serial No. 109,552

4 Claims. (Cl. 260—449.6)

This invention relates to the synthesis of hydrocarbons by the reaction between carbon monoxide and hydrogen in the presence of a solid synthesis catalyst and particularly relates to a method of starting up units comprising a reactor and necessary auxiliary equipment employed in the practice of a process for the synthesis of hydrocarbons by the reaction between carbon monoxide and hydrogen.

Several methods for carrying out the reaction between carbon monoxide and hydrogen in the presence of a solid synthesis catalyst have been proposed, including methods involving the use of a fixed bed of solid synthesis catalyst in which temperature control is accomplished by means of indirect heat exchange elements, methods in which the synthesis gas mixture is contacted with the catalyst disposed in a static fluidized bed, and methods operated on the adiabatic principle wherein the necessary temperature control is effected by controlling the composition, temperature, and rate of flow of the synthesis gas mixture. These methods are usually carried out at pressures of the order of 50 to 650 pounds per square inch and elevated reaction temperatures varying from about 350° to 700° F. depending upon the particular catalyst used.

Once a unit for practicing a synthesis method has been placed on stream, operating the unit usually presents no great difficulties. However, because of the highly exothermic nature of the reaction and the necessity of bringing the unit up to operating pressure, the starting up of such a unit has come to be recognized as involving serious problems. Our work has indicated that during the start-up period different reactions take place and that the catalyst, which is either a fresh catalyst or a regenerated catalyst, is more sensitive, than during the on-stream period. It is believed that the poor results that a times have been obtained in synthesis methods may be due to the start-up procedure used as distinguished from the on-stream operating conditions.

The present invention is concerned with a method of starting up synthesis units whereby such units are brought smoothly and efficiently into full operation without damage to the catalyst and without dislocation of operation due to changes in pressure. The invention will be illustrated by a preferred embodiment which will be described in connection with the accompanying drawing in which the single figure is a diagrammatic illustration in the nature of a flow sheet of a suitable unit. This unit is particularly adapted for use in the practice of a synthesis process in which the reaction section is operated on the adiabatic principle, the control of the temperature of the catalyst bed being accomplished by controlling the composition, temperature and rate of flow of the total feed to the reactor. The process also comprises cooling the reaction products, separating condensed hydrocarbons, water and oxygenated compounds, and recycling most of the remainder of the reaction products to the reactor in admixture with fresh feed. The catalyst preferably employed is an iron synthesis catalyst, especially one which is partially or wholly reduced from the oxide and particularly an iron catalyst 50 to 100 per cent reduced from the oxide.

The unit or system disclosed in the drawing will first be described in connection with the on-stream operation. Referring to the drawing, the fresh feed consisting essentially of hydrogen and carbon monoxide preferably having a mol ratio of hydrogen to carbon monoxide of at least 2.5:1, and preferably between about 2.9:1 and 3.2:1, is fed into the system under pressure at a controlled rate through a line 1 provided with a valve 2 and a valve 3, the latter valve being used principally during the start-up procedure. There is also provided a by-pass line 4 having a valve 6 which also is normally used only under certain conditions of operation during the start-up period. The fresh feed flows from line 1 into line 7 in which is flowing recycled gases as will presently be described. The mixture of fresh feed and the recycled gases passes through a gas heater 8 wherein the temperature of the gases is preferably raised to the temperature maintained at the top of the catalyst bed; for example, a temperature between about 430° and 500° F. for an iron type catalyst. The gases at this temperature are passed from the gas heater through line 9 leading to a fixed bed reactor 11.

The reactor 11 is of simple design and comprises a cylindrical vessel in which is disposed a solid bed of catalyst 12. The catalyst is supported on a suitable foraminous support 13 and may, if desired, be confined at its upper surface by a similar foraminous member 14. The heated gases are introduced at a selected rate such as to obtain a desired space velocity; for example a space velocity (volume of fresh feed at standard conditions per volume of catalyst per hour) of 300 or greater. The temperature at the top of the catalyst bed is maintained at about the temperature of the entering gases. When the entering gases pass through the catalyst bed the desired synthesis reaction takes place and the temperature of the bed is controlled by the composition and volume of the total feed to the reactor. There should be a substantial temperature gradient across the bed; for example, a temperature gradient of the order of 100° to 200° F.

The product gases are removed from the bottom of the reactor through a line 16 and are passed through a heat exchanger 17. This heat exchanger is preferably employed for the production of steam and for this purpose is shown connected with a steam drum 18 by means of lines 19 and 21. The reaction products, somewhat reduced in temperature, are then passed through lines 22 and 23 and are then cooled additionally in a cooler 24 in which their temperature is reduced to at least 120° F., the specific temperature being sufficiently low to cause condensation of the desired products. The cooled products are then passed through line 26 leading to a separator 27 of conventional design. In this separator an aqueous layer and a liquid hydrocarbon layer are formed. The hydrocarbons which are liquid under these conditions are removed from the system through a line 28 and the aqueous layer comprising a solution of oxygenated compounds, such as alcohols and ketones, is removed through line 29. The remaining gaseous products are passed from the separator through line 31 and are returned in major part to the reactor. A portion is vented from the system through a line 33 controlled by a valve 34, the operation of which is determined by the pressure in the reactor 11 by means of a pressure controller indicated generally at 36. The remainder of the gases is pumped by means of pump 32 into line 7 and is mixed with fresh feed as previously described. This process is carried out at an elevated pressure, preferably about 150 pounds per square inch, although pressures within the range of about 50 to about 650 pounds per square inch are suitable.

It will be understood that except insofar as it is necessarily related to the start-up procedure, the method of on-stream operation described above forms no part of the present invention and that the start-up method may be employed in connection with other types of on-stream operation.

In accordance with the invention, a unit as described in the drawing is placed in operation in the following manner. The reactor will be filled either with fresh catalyst or catalyst which has been regenerated following an on-stream operation. Prior to beginning the start-up operation, any necessary catalyst reduction or purging steps should be completed. The valves in lines 1, 4, 22, 28 and 29 are then closed and the valve 34 in line 33 is adjusted to hold the desired operating pressure, which, as an example, may be about 150 pounds per square inch. Hydrogen under a pressure in excess of the operating pressure is then introduced through line 37 until the pressure of the entire unit has been brought up to 150 pounds per square inch. The flow of hydrogen into the unit is controlled by valve 38 which is actuated by pressure controller 36 so as to maintain the unit pressure at 150 pounds per square inch. Pressure control valves 38 and 34 are so adjusted that when valve 38 is about to close, valve 34 is about to open, or vice versa. At this time or at some earlier time during the introduction of hydrogen, the recycle pump 32 is put into operation as well as the gas heater 8. The pump and the gas heater are operated as desired for the on-stream operation to follow. Thus, the pump is set for the desired recycle ratio and the heater is operated so as to heat the hydrogen to the desired reaction initiation temperature which, as previously stated, in the case of an iron catalyst may be about 430° to 500° F.

The introduction of synthesis gas through line 1 at a very low rate is then started to bring in contact with the catalyst in the reactor at reaction initiation temperature a mixture consisting very largely of hydrogen but containing a small amount of synthesis gas. The amount of synthesis gas initially introduced is adjusted so that the maximum temperature attained in the catalyst bed does not exceed a predetermined value above which injury to the catalyst would occur. This temperature, in the case of iron synthesis catalyst, is about 630° F. To insure that the rate of feed of synthesis gas is properly adjusted, the unit includes a multipoint thermocouple indicated generally at 39 and with thermocouple points located throughout the length of the bed. The thermocouple is connected with a temperature controller 41 which actuates the valve 3 in line 1. Should the amount of synthesis gas introduced at any time be so great as to cause an undue rise in temperature, the flow of synthesis gas is decreased by operation of valve 3. As the catalyst becomes conditioned to the reaction, the rate of introduction of synthesis gas is gradually increased, preferably in stages which may be of the order of one to two hours in duration, until eventually the sole fresh feed to the unit is the synthesis gas introduced through line 1. During the gradual introduction of the synthesis gas, the introduction of hydrogen through line 37 is carried out so as to maintain the desired pressure of 150 pounds per square inch. We have found it essential that the pressure should be kept substantially constant at all times as otherwise unregulated reaction is likely to occur and the start-up procedure will take an unduly long time.

The introduction of hydrogen after the unit has been brought up to operating pressure and the introduction of synthesis gas has been started can be varied in two ways to control the pressure in the unit. In a system as disclosed in the drawing, once the pressure in the unit has reached the on-stream operating pressure, the flow of hydrogen through line 37 will normally be shut off, hydrogen only being introduced when necessary to maintain the pressure substantially constant. In other types of installations, the hydrogen may be introduced into the system continuously, the pressure in the unit being held by a vent line valve. When operating in this way, the rate of introduction of hydrogen, while continuous, is varied to maintain substantially constant pressure.

It appears that the initial reactions taking place between the carbon monoxide and the hydrogen in the synthesis gas largely result in the production of light gases, principally methane and water. These reactions, however, result in a contraction of the volume of the synthesis gas which would cause a reduction in pressure in the absence of the control of introduction of hydrogen in the manner described. It will be understood that during the initial stages of the start-up procedure little if any hydrocarbon liquid at temperatures between about 40° and about 120° F., to which the reactor effluent is preferably cooled, are formed, and therefore the liquid separated in separator 27 will consist largely of water. However, as the percentage of synthesis gas in the feed to the reactor is increased, the synthesis of heavier hydrocarbons will begin to take place and the separator will go into efficient operation. When a substantial amount of water and hydrocarbons has been collected in separator 27, the valves in lines 28 and 29 are opened to remove these products while still holding unit pressure.

As stated above, when the system has reached conditions permitting the permanent closing-off of the introduction of hydrogen and the introduction of the total feed to the reactor consisting of a mixture of synthesis gas and recycled gases, the unit is on-stream. During this on-stream operation the selected ratio of fresh feed to recycled gases will be maintained. It is an advantage of the present invention that during the start-up procedure the recycle pump can be set for the desired recycle ratio and need not be changed when beginning full on-stream operation.

It will thus be seen that by operation in the manner disclosed, the unit is brought smoothly and efficiently into full operation without damage to the catalyst due to excessive temperatures and without dislocation of operation due to pressure surges. The start-up procedure is particularly valuable for use in the start-up of units employing partially or wholly reduced iron catalysts apparently because the excess of hydrogen and the careful temperature control tends to protect the catalyst against being carbided by the reaction between free iron and carbon monoxide. It is thought that the hydrogen is adsorbed on the surface of the catalyst more easily than carbon monoxide thus retarding a carbiding reaction between free iron and carbon monoxide.

As stated previously, the invention is particularly applicable to the start-up of units employing an iron synthesis catalyst. A preferred catalyst of this type is one which is prepared from a precipitated iron oxide. The catalyst may be employed in the oxide state but superior results are usually obtained when the catalyst has been from 10 to 100 per cent reduced from the oxide and preferably from 50 to 100 per cent reduced from the oxide. When used in a fixed bed unit such as that disclosed in the drawing, the catalyst will be prepared in the form of granules, pellets or particles; for example, the catalyst may be employed in the form of ⅛ inch pellets. The method of the invention is also applicable to the start-up of units in which other solid synthesis catalysts are employed. Examples of such catalysts are nickel and cobalt type catalysts.

It will be understood by those skilled in the art that the invention is not limited to starting up of units such as that disclosed in the drawing, but may be employed with advantage for starting up the other types of units that have been proposed for use in synthesis operations such as, for example, fixed bed "once-through" units, static fluidized bed units and fixed bed units provided with indirect heat exchange elements. In each case the start-up method comprises first pressuring the unit with hydrogen to the desired on-stream operating pressure, usually within the range of about 50 to 650 pounds per square inch, and maintaining this pressure constant throughout the start-up period. Because the possibility of the creation of excessive temperatures is an especially serious problem in the start-up of units comprising reactor sections operated on the adiabatic principle, the present method is particularly valuable when employed in starting up these units. It will be understood that in an adiabatic type operation, it is not necessary that the entire reactor effluent be cooled to cause condensation of hydrocarbons liquefiable at the existing temperature and pressure conditions, as satisfactory results are obtained by continuously removing a portion of the reaction products from the system, recovering desired hydrocarbons and oxygenated compounds from the portion removed, and recycling the remaining portion in admixture with fresh feed to the reactor. In this case the reaction products need only be cooled to the reaction initiation temperature and the separator forming part of the unit disclosed in the drawing is not required.

Obviously many modifications and variations of the invention, as hereinbefore set forth, may be made without departing from the spirit and scope thereof, and therefore only such limitations should be imposed as are indicated in the appended claims.

We claim:

1. In the synthesis of hydrocarbons by contacting a bed of iron synthesis catalyst with a total feed gas consisting of a synthesis gas consisting of hydrogen and carbon monoxide in a mol ratio of at least 2.5:1 and recycled gas comprising a fraction of the products of the reaction at a superatmospheric synthesis pressure and an elevated reaction initiation temperature of above about 430° F. in a synthesis unit comprising a catalytic reaction zone and a liquid product recovery zone in which said recycled gas is separated from the product gases formed in the catalytic reaction zone, the method of starting up the unit which comprises pressuring the unit with a gas consisting of hydrogen to said superatmospheric synthesis pressure, circulating said gas consisting of hydrogen in said unit comprising said catalytic reaction zone and said liquid product recovery zone at said reaction initiation temperature and said superatmospheric synthesis pressure at the rate of circulating recycled gas during on-stream operation, then, while maintaining the unit at said superatmospheric synthesis pressure by controlling the introduction of hydrogen, introducing synthesis gas into the circulating hydrogen in advance of said catalytic reaction zone at an increasing rate controlled to maintain the temperature of the catalyst in the reaction zone below about 630° F. while recycling reactor effluent until the fresh feed to said unit consists of said synthesis gas, and continuing the introduction of synthesis gas into said unit in an on-stream period during which hydrocarbons are synthesized.

2. A method in accordance with claim 1 in which said reaction initiation temperature is within the range of about 430° to about 500° F.

3. A method in accordance with claim 2 in which said iron synthesis catalyst is at least partially reduced from the oxide.

4. In the synthesis of hydrocarbons by contacting a fixed solid bed of iron synthesis catalyst at least partially reduced from the oxide under abiabatic conditions with a total feed gas consisting of a synthesis gas consisting of hydrogen and carbon monoxide in a mol ratio of at least 2.5:1 and recycled gas comprising a fraction of the products of the reaction at a superatmospheric synthesis pressure and an elevated reaction initiation temperature within the range of about 430° to about 500° F. in a synthesis unit comprising a catalytic reaction zone and a liquid product recovery zone in which said recycled gas is separated from the product gases formed in the catalytic reaction zone, the method of starting up the unit which comprises pressuring the unit with a gas consisting of hydrogen to said superatmospheric synthesis pressure, circulating said gas consisting of hydrogen in said unit comprising said catalytic reaction zone and said liquid product recovery zone at said reaction initiation temperature and said superatmospheric synthesis pressure at the rate of circulating recycled gas during on-stream operation, then, while maintaining the unit at said superatmospheric synthesis pressure by controlling the introduction of hydrogen, introducing synthesis gas into the circulating hydrogen in advance of said catalytic reaction zone at an increasing rate controlled to maintain the temperature of the catalyst in the reaction zone below about 630° F. while recycling reactor effluent until the fresh feed to said unit consists of said synthesis gas, and continuing the introduction of synthesis gas into said unit in an on-stream period during which hydrocarbons are synthesized.

References Cited in the file of this patent
UNITED STATES PATENTS

| Number | Name | Date |
|---|---|---|
| 2,461,570 | Roberts | Feb. 15, 1949 |
| 2,498,845 | Smith et al. | Feb. 28, 1950 |
| 2,527,846 | Phinney et al. | Oct. 31, 1950 |
| 2,532,621 | Hogan | Dec. 5, 1950 |
| 2,533,694 | Safford | Dec. 12, 1950 |
| 2,541,677 | Sumerford et al. | Feb. 13, 1951 |
| 2,542,422 | McGrath | Feb. 20, 1951 |